(12) United States Patent
Itazuri

(10) Patent No.: US 11,987,242 B2
(45) Date of Patent: May 21, 2024

(54) LANE DEPARTURE PREVENTION DEVICE

(71) Applicant: TOYOTA JIDOSHA KABUSHIKI KAISHA, Toyota (JP)

(72) Inventor: Kazuki Itazuri, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 273 days.

(21) Appl. No.: 17/704,533

(22) Filed: Mar. 25, 2022

(65) Prior Publication Data

US 2022/0363252 A1 Nov. 17, 2022

(30) Foreign Application Priority Data

May 11, 2021 (JP) ................................. 2021-080437

(51) Int. Cl.
*B60W 30/12* (2020.01)
*B60W 10/20* (2006.01)
(Continued)

(52) U.S. Cl.
CPC ............ *B60W 30/12* (2013.01); *B60W 10/20* (2013.01); *B60W 30/146* (2013.01);
(Continued)

(58) Field of Classification Search
CPC .... B60W 10/20; B60W 30/12; B60W 30/146; B60W 40/105; B60W 40/13; B60W 50/10; B60W 50/16; B60W 2040/1315; B60W 2050/143; B60W 2050/146; B60W 2420/403; B60W 2520/14; B60W 2540/20; B60W 2552/53; B62D 15/025; G06V 20/588; G05D 1/0061; G05D 1/0088; G05D 1/021; G05D 1/0214; G05D 1/0221; G05D 1/0223
See application file for complete search history.

(56) References Cited

U.S. PATENT DOCUMENTS 10,839,689 B2 * 11/2020 Mizoguchi ......... B62D 15/0255
2009/0005933 A1 1/2009 Tabata et al.

FOREIGN PATENT DOCUMENTS

JP 2019-177762 A 10/2019

OTHER PUBLICATIONS

Unpublished U.S. Appl. No. 17/531,233, filed Nov. 19, 2021 Inventor: Daisuke Fukutomi.

* cited by examiner

*Primary Examiner* — Hung Q Nguyen
*Assistant Examiner* — Mark L. Greene
(74) *Attorney, Agent, or Firm* — Sughrue Mion, PLLC

(57) ABSTRACT

A lane departure prevention device includes a control unit that executes lane keeping control (automatic steering of a steering wheel and/or issuing of a warning) when it is determined that a vehicle may move out of a lane. The control unit withholds execution of the lane keeping control until it is determined that a return-to-control condition is satisfied when it is determined that a driver has gone from showing no intention to move out of the lane to showing an intention to move out of the lane to cross a first lane boundary. The control unit continues, when it is determined that the vehicle is approaching a second white line present in a traveling direction with a speed equal to or faster than a reference value, continues withholding the execution of the lane keeping control even when it is determined that the return-to-control condition is satisfied.

7 Claims, 5 Drawing Sheets

(51) Int. Cl.
*B60W 30/14* (2006.01)
*B60W 40/105* (2012.01)
*B60W 40/13* (2012.01)
*B60W 50/10* (2012.01)
*B60W 50/16* (2020.01)
*B62D 15/02* (2006.01)
*G06V 20/56* (2022.01)
*B60W 50/14* (2020.01)

(52) U.S. Cl.
CPC .......... *B60W 40/105* (2013.01); *B60W 40/13* (2013.01); *B60W 50/10* (2013.01); *B60W 50/16* (2013.01); *B62D 15/025* (2013.01); *G06V 20/588* (2022.01); *B60W 2040/1315* (2013.01); *B60W 2050/143* (2013.01); *B60W 2050/146* (2013.01); *B60W 2420/403* (2013.01); *B60W 2520/14* (2013.01); *B60W 2540/20* (2013.01); *B60W 2552/53* (2020.02)

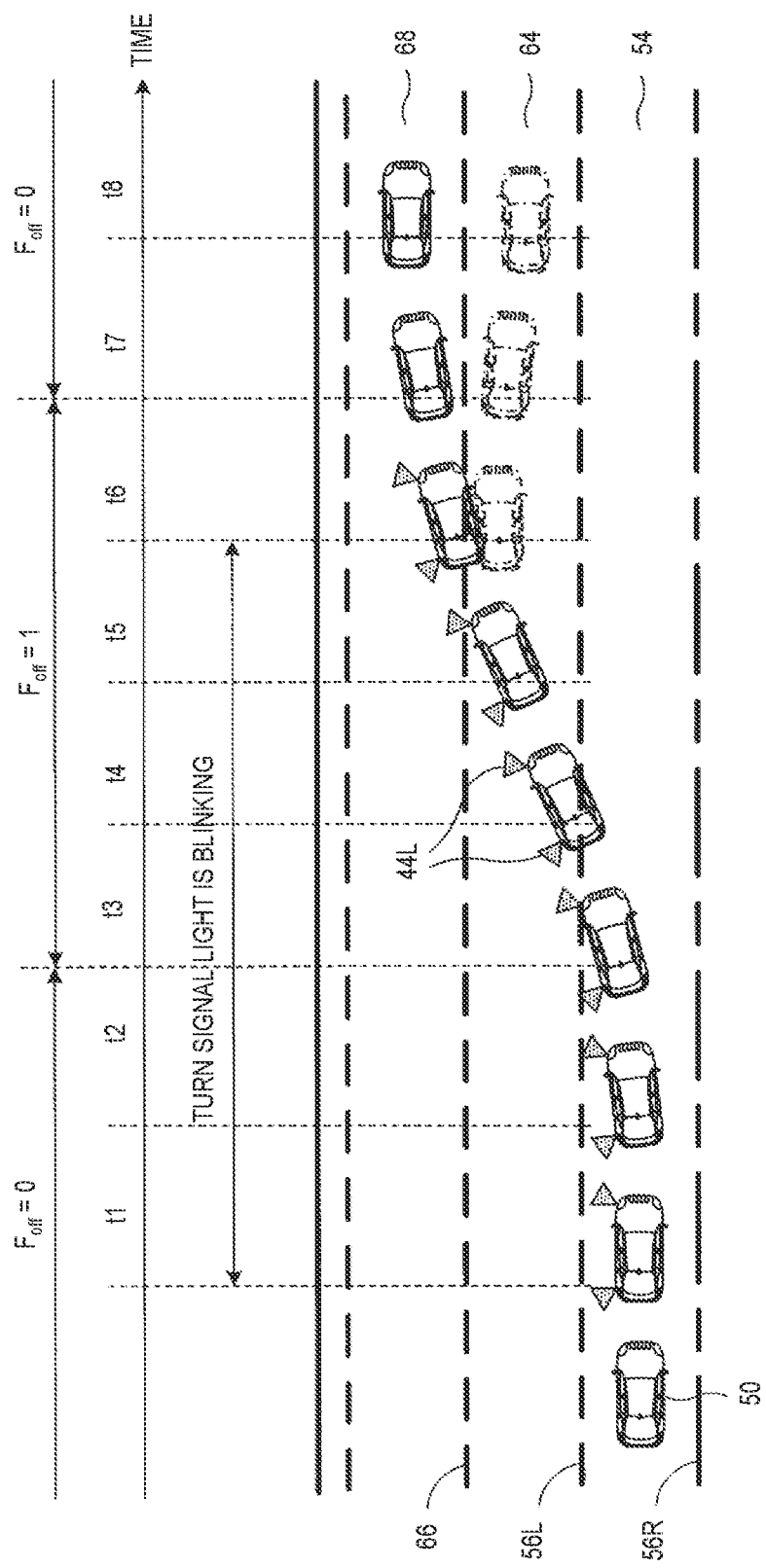

LANE DEPARTURE PREVENTION DEVICE

CROSS-REFERENCE TO RELATED APPLICATION

This application claims priority to Japanese Patent Application No. 2021-080437 filed on May 11, 2021, incorporated herein by reference in its entirety.

BACKGROUND

1. Technical Field

The present disclosure relates to a lane departure prevention device for a vehicle such as an automobile.

2. Description of Related Art

A lane departure prevention device detects a vehicle position with respect to a lane by a vehicle position detector, and executes lane keeping control, which is at least one of automatic steering of a steering wheel and issuing of a warning, when it is determined that a vehicle may move out of the lane based on the detected vehicle position.

In a case where the lane keeping control interferes with driving operation based on the driver's intention to change lanes or control that lowers a turning level of the vehicle, the lane keeping control needs to be restricted. For example, Japanese Unexamined Patent Application Publication No. 2019-177762 (JP 2019-177762 A) discloses that lane keeping control is restricted when a steering speed equal to or greater than a reference value, a steering torque equal to or greater than a reference value, and/or a change amount of steering torque that is equal to or greater than a reference value is detected.

SUMMARY

In the lane departure prevention device as described in JP 2019-177762 A, when the vehicle moves to an adjacent lane, a determination is made that a condition for return to the lane keeping control is satisfied and the lane keeping control is reactivated. Accordingly, even if a driver tries to move from an adjacent lane to another adjacent lane or a roadside zone, automatic steering of a steering wheel hinders the driver in making the second move out of the lane, and thus the driver cannot smoothly move out of the lane again and will feel discomfort.

The present disclosure provides a further improved lane departure prevention device, which enables the driver to smoothly move out of the lane again in a case where they move to the adjacent lane and try to move again to another adjacent lane or the roadside zone.

The lane departure prevention device according to an aspect of the present disclosure includes a vehicle position detector (camera sensor) configured to detect a vehicle position of a vehicle with respect to a lane, and a control unit (LDA•ECU) configured to, when a determination is made that there is a possibility that a vehicle will move out of the lane based on the vehicle position detected by the vehicle position detector, execute lane keeping control, which is at least one of automatic steering of a steering wheel and issuing of a warning. The control unit is configured to, when a determination is made that a driver has gone from showing no intention to move out of the lane to showing an intention to move out of the lane to cross a first lane boundary, withhold the execution of the lane keeping control until a determination is made that a preset return-to-control condition is satisfied.

In the above aspect, the control unit (LDA•ECU) may continue, when a determination is made that the vehicle is approaching a second lane boundary (white line) present ahead of the vehicle to which the vehicle will travel with a speed equal to or faster than a reference speed, withholding the execution of the lane keeping control even when the determination is made that the return-to-control condition is satisfied.

With the configuration stated above, when the determination is made that the vehicle is approaching the second lane boundary present ahead of the vehicle to which the vehicle will travel with the speed equal to or faster than a reference speed, the execution of the lane keeping control is kept withheld even if the determination is made that the return-to-control condition is satisfied. Therefore, since the lane keeping control does not automatically steer the steering wheel and issue a warning, the vehicle can move out of the lane, i.e. change lanes, for example, by crossing the second lane boundary present ahead of the vehicle to which the vehicle will travel. Accordingly, the driver does not feel discomfort due to being unable to smoothly move out of the lane again, or feel annoyed due to an unnecessary warning.

In the above aspect, the control unit (LDA•ECU) may withhold, when the determination is made that the vehicle is approaching the second lane boundary (white line) with a speed equal to or faster than the reference speed, the execution of the lane keeping control even when a determination is made that the driver has lost their intention to move out of the lane to cross the second lane boundary before the return-to-control condition is satisfied.

With the aspect stated above, when the determination is made that the vehicle is approaching the second lane boundary present in the traveling direction with the speed equal to or faster than a reference speed, the execution of the lane keeping control is kept withheld even if the determination is made that the driver has lost their intention to move out of the lane to cross the second lane boundary before the return-to-control condition is satisfied. Therefore, since the lane keeping control does not automatically steer the steering wheel and issue a warning, the vehicle can move out of the lane, i.e. change lanes, for example, by crossing the second lane boundary present ahead of the vehicle to which the vehicle will travel. Accordingly, the driver does not feel discomfort due to being unable to smoothly move out of the lane again, or feel annoyed due to an unnecessary warning.

In the above aspect, the control unit (LDA•ECU) may determine that the return-to-control condition is satisfied at the earlier of a time when a determination is made that a time equal to or longer than a reference time has elapsed from a time point at which the driver has gone from showing no intention to move out of the lane to showing an intention to move out of the lane to cross a first lane boundary, or a time when a determination is made that the vehicle has crossed the first lane boundary.

With the aspect stated above, the determination is made that the return-to-control condition is satisfied at the earlier of the time when the determination is made that a time longer than the reference time has elapsed from the time point at which the driver has gone from showing no intention to move out of the lane to showing an intention to move out of the lane to cross a first lane boundary, or the time when the determination is made that the vehicle has crossed the first lane boundary. Accordingly, it is possible to prevent a situation where the automatic steering of the steering wheel or the issuing of the warning is not performed for an unnecessarily long time period by the lane keeping control, and to prevent the vehicle from moving out of the lane by executing the lane keeping control of the steering wheel when the vehicle may move out of the lane.

In the above aspect, the control unit (LDA•ECU) may variably set the reference time according to a vehicle speed such that the reference time becomes shorter as the vehicle speed increases.

With the aspect stated above, the reference time is variably set according to the vehicle speed such that the reference time becomes shorter as the vehicle speed increases. Accordingly, it is possible to appropriately determine whether the return-to-control condition is satisfied, as compared with a case where the reference time is constant regardless of the vehicle speed.

In the above aspect, the control unit (LDA•ECU) may variably set the reference speed according to a vehicle speed such that the reference speed becomes faster as the vehicle speed decreases.

With the aspect stated above, the reference speed is variably set according to the vehicle speed such that the reference speed becomes faster as the vehicle speed decreases. Accordingly, it is possible to appropriately determine whether the return-to-control condition is satisfied, as compared with a case where the reference speed is constant regardless of the vehicle speed.

In the above aspect, the control unit (LDA•ECU) may variably set the reference speed according to a yaw angle of the vehicle such that the reference speed becomes slower as the yaw angle is larger with respect to a longitudinal direction of the lane.

With the aspect stated above, the reference speed is variably set according to the yaw angle of the vehicle such that the reference speed becomes slower as the yaw angle the vehicle is larger with respect to the longitudinal direction of the lane. Accordingly, it is possible to appropriately determine whether the return-to-control condition is satisfied, as compared with a case where the yaw angle of the vehicle with respect to the longitudinal direction of the lane is not considered.

In the above aspect, the control unit (LDA•ECU) may determine that the driver has shown an intention to move out of the lane when the driver performs at least one of shifting a turn signal lever in a direction in which the vehicle will move out of the lane or steering in a direction in which the vehicle moves out of the lane.

With the aspect stated above, it is determined that the driver has shown an intention to move out of the lane to cross the first lane boundary when the driver performs at least one of shifting the turn signal lever in a direction in which the vehicle will move out of the lane or steering in the direction in which the vehicle moves out of the lane. Accordingly, it is possible to appropriately determine whether or not the driver has shown an intention to move out of the lane as compared with a case where the determination is made based on only one of shifting the turn signal lever in the direction in which the vehicle will move out of the lane or steering in the direction in which the vehicle moves out of the lane.

For better understanding, names and/or reference numerals used in an embodiment of the present disclosure (described below) are added in parentheses to the configuration corresponding to the embodiment. However, each component of the present disclosure is not limited to a component of the embodiment corresponding to the name and/or reference numeral accompanying in parentheses. Other objects, features and advantages of the present disclosure will be readily understood from the description on the embodiment of the present disclosure, which is described with reference to the following drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a diagram illustrating a specific example of operation of the embodiment in a case where the condition for return to the lane keeping control is satisfied and the lateral speed $V_y$ is equal to or greater than the reference speed $V_{yc}$.

DETAILED DESCRIPTION OF EMBODIMENTS

The lane departure prevention device according to an embodiment of the present disclosure will be described in detail with reference to drawings.

Configuration

Figure 1:
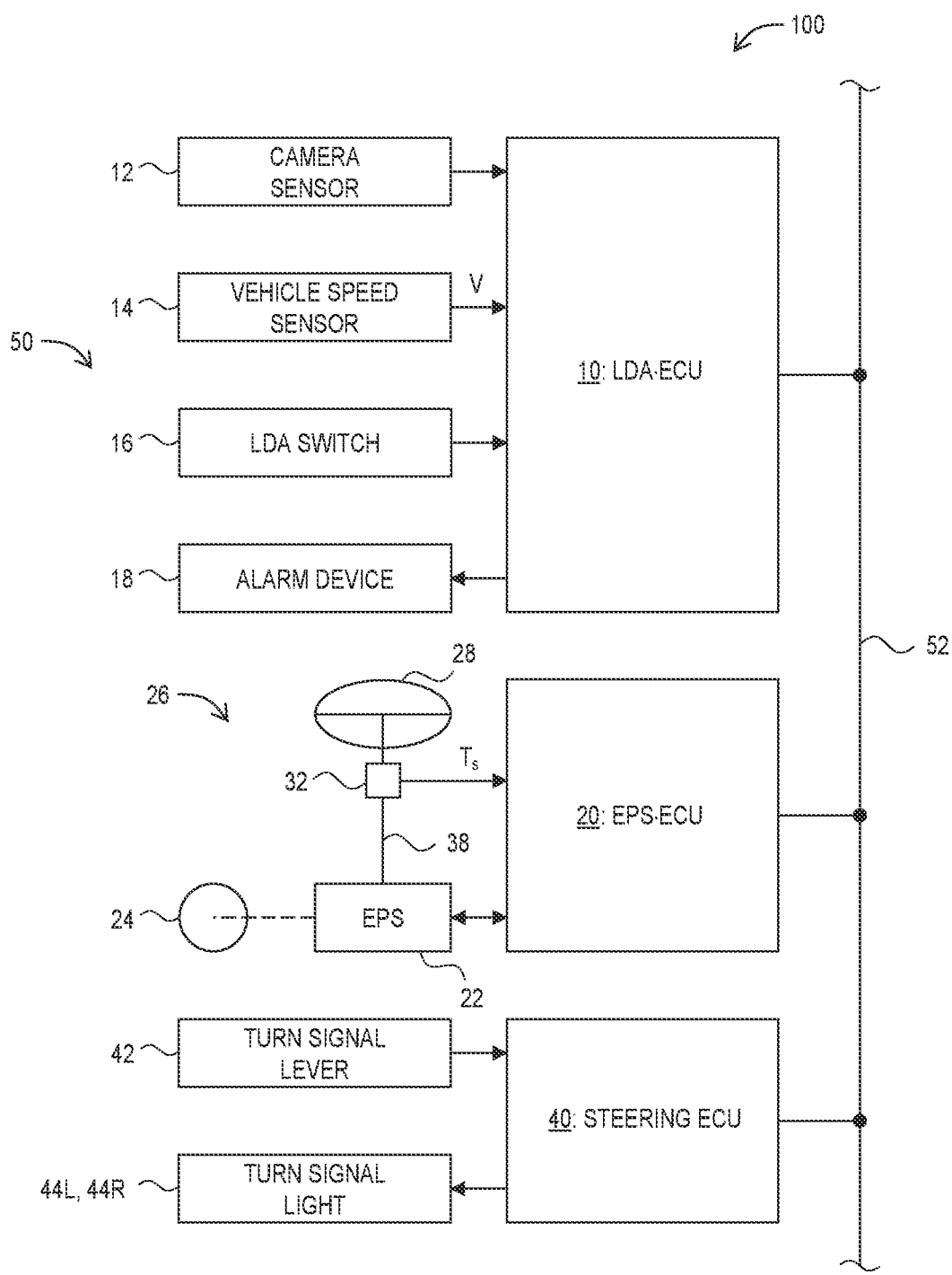
FIG. 1 is a schematic configuration diagram illustrating an embodiment of a lane departure prevention device according to the present disclosure.

As shown in FIG. 1, a lane departure prevention device 100 according to the embodiment is adopted in a vehicle 50, and includes a lane departure prevention ECU 10, an electric power steering ECU 20, and a steering ECU 40. In the present specification, lane departure prevention is referred to as Lane Departure Alert with Control (LDA) as necessary, and electric power steering is referred to as EPS (abbreviation of "Electric Power Steering") as necessary.

These ECUs are electronic control units respectively including a microcomputer as a main unit, and are connected to each other via a controller area network (CAN) 52 such that they are able to exchange information with each other. Each microcomputer includes a CPU, a ROM, a RAM, a non-volatile memory, and an interface. The CPU is configured to implement various functions by executing instructions (programs or routines) stored in the ROM. Any or all of these ECUs may be integrated into a single ECU.

Figure 2:
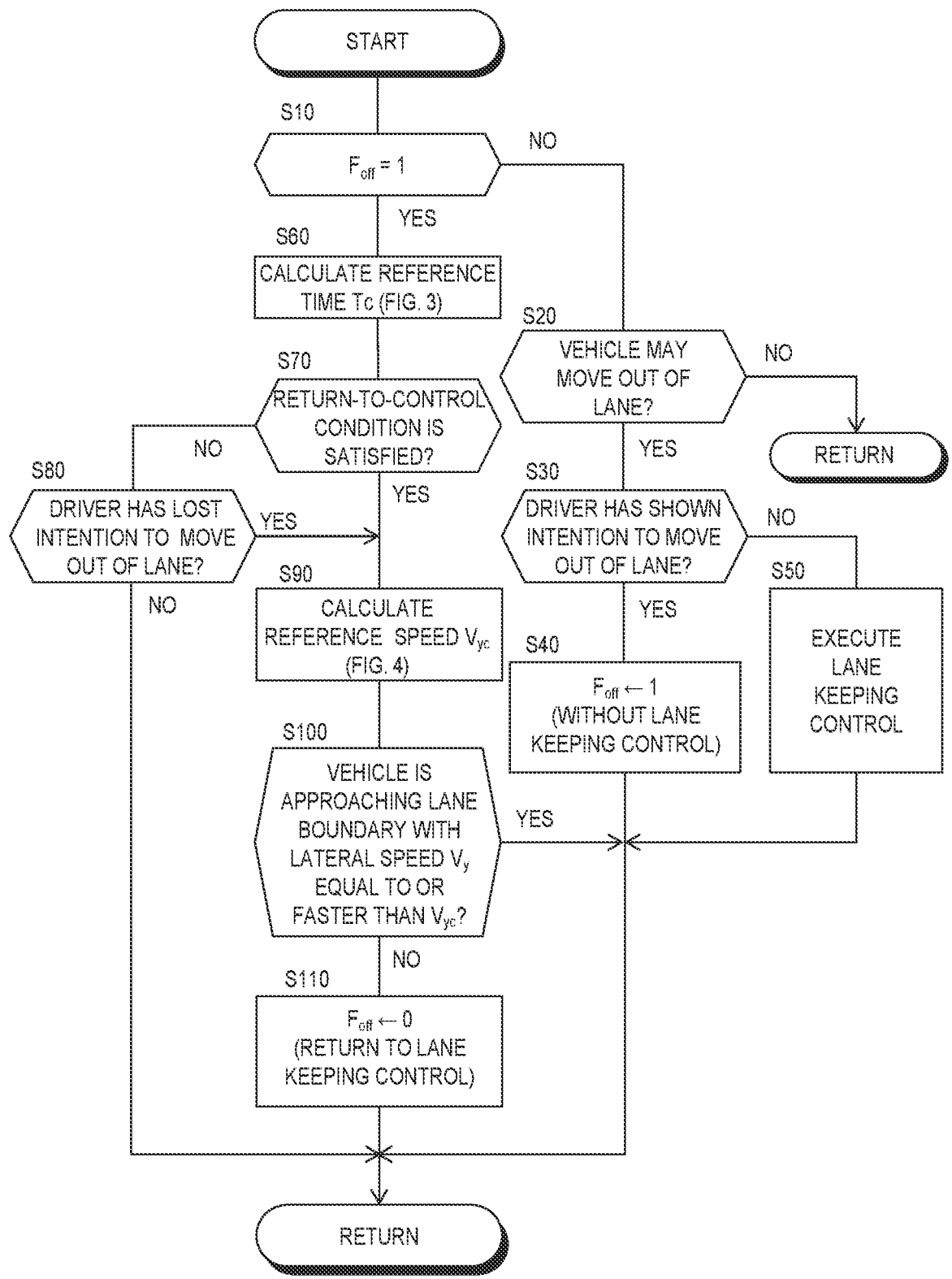
FIG. 2 is a flowchart illustrating a lane departure prevention control routine according to the embodiment of the present disclosure.

As will be described in detail below, the ROM of the LDA•ECU 10 stores a lane departure prevention control program corresponding to the flowchart shown in FIG. 2, and the CPU executes the lane departure prevention control according to the program. The LDA•ECU 10 is connected to a camera sensor 12, a vehicle speed sensor 14, an LDA switch 16, and an alarm device 18.

The camera sensor 12 includes a camera unit and a lane recognition unit that analyzes image data obtained by taking photographs with the camera unit to recognize a white line on a road. The camera sensor 12 (camera unit) captures a scene in front of the vehicle 50. The camera sensor 12 (lane recognition unit) repeatedly supplies information on the recognized white line to the LDA•ECU 10 every time a predetermined calculation cycle elapses.

Figure 5:
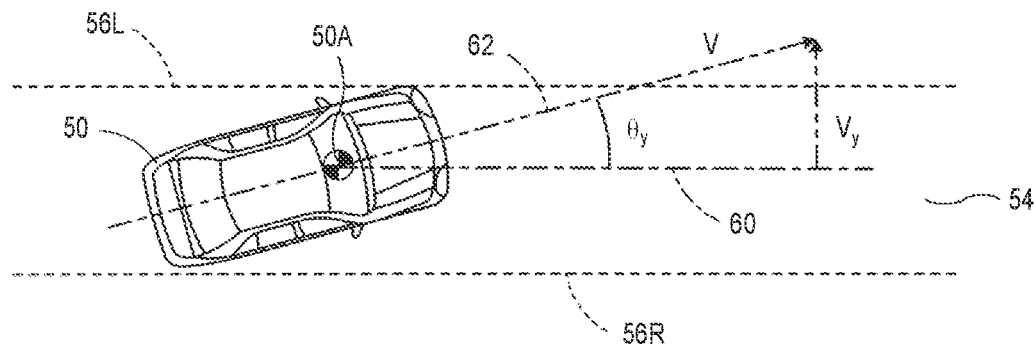
FIG. 5 is a diagram illustrating a situation in which a vehicle is traveling at an angle with respect to a longitudinal direction of a lane.

As shown in FIG. 5, the camera sensor 12 recognizes white lines 56L and 56R, which are boundaries of a lane 54 (referred to as lane boundaries), and is capable of detecting a relative positional relationship of the vehicle with respect to the lane 54, based on a relationship between the white lines and a vehicle position of the vehicle 50. The vehicle position of the vehicle 50 is a position of a center of gravity 50A of the vehicle, but it may be a center position of the vehicle in a plan view. A lateral position of the vehicle, which will be described below, represents a position of the center of gravity of the vehicle in a lane width direction, and a lateral speed of the vehicle represents a speed of the center of gravity of the vehicle in the lane width direction. These are obtained based on the relative positional relationship between the vehicle and the white lines detected by the camera sensor 12.

The vehicle speed sensor 14 detects the vehicle speed V of the vehicle 50 and repeatedly supplies a signal indicating the vehicle speed V to the LDA•ECU 10 at a predetermined control cycle. The LDA switch 16 is operated by the driver and supplies, to the LDA•ECU 10, a signal indicating whether it is turned on or not. When the LDA switch 16 is turned on, it means that the lane departure prevention control is executed.

The alarm device 18 is activated when the LDA•ECU 10 determines that the vehicle 50 may move out of the lane 54, and issues a warning as the lane keeping control, that is, issues a warning indicating that the vehicle 50 may move out of the lane. The alarm device 18 may be any of an alarm device that issues a visual warning such as an alarm lamp, an alarm device that issues an auditory warning such as an alarm buzzer, and an alarm device that issues a warning that the driver can feel, such as vibration of a seat, or alternatively, any combination thereof.

An EPS•ECU 20 can steer steered wheels 24 as needed by controlling an EPS device 22. Consequently, a steering device 26 is configured by the EPS•ECU 20 and the EPS device 22 to automatically steer the steered wheels 24 as needed. The EPS•ECU 20 automatically steers the steered wheels 24 as another lane keeping control to prevent the vehicle from moving out of the lane when the LDA•ECU 10 determines that the vehicle 50 may move out of the lane.

As shown in FIG. 1, a steering shaft 30 to which a steering wheel 28 operated by the driver is integrally connected is provided with a torque sensor 32 for detecting a steering torque Ts. A signal indicating the steering torque Ts detected by the torque sensor 32 is input to the EPS•ECU 20. The EPS•ECU 20 controls a steering assist torque and reduces the steering burden of the driver, by controlling the EPS device 22 in a manner known in the art based on the steering torque Ts and the vehicle speed V detected by the vehicle speed sensor 14. The signal indicating the steering torque Ts is input to the LDA•ECU 10 from EPS•ECU 20 via the CAN 52.

A turn signal lever 42 operated by the driver and turn signal lights 44L and 44R are connected to the steering ECU 40. When the turn signal lever 42 is shifted to a left-turn direction of the vehicle 50, the steering ECU 40 causes the front and rear turn signal lights 44L on the left side of the vehicle 50 to blink. When the turn signal lever 42 is shifted to a right-turn direction of the vehicle 50, the steering ECU 40 causes the front and rear turn signal lights 44R on the right side of the vehicle 50 to blink. Shift information of the turn signal lever 42 is input from the steering ECU 40 to the LDA•ECU 10 via the CAN 52.

Lane Departure Prevention Control Routine

A lane departure prevention control routine in the embodiment will be described referring to the flowchart shown in FIG. 2. The lane departure prevention control according to the flowchart shown in FIG. 2 is repeatedly executed by the CPU of the LDA•ECU 10 at the predetermined control cycle when the LDA switch 16 shown in FIG. 1 is turned on. In the following description, the lane departure prevention control is simply referred to as "control".

In step S10, the CPU determines whether a flag $F_{off}$ is 1 or not, that is, whether or not the lane keeping control is not being executed. When a determination of "YES" is made, the CPU advances the control to step S60. When a determination of "NO" is made, the CPU advances the control to step S20. The flag $F_{off}$ is reset to 0 when the control is activated, and then set to 0 or 1 according to the flowchart shown in FIG. 2 as described below.

In step S20, the CPU determines whether or not the vehicle may move out of the lane in a manner known in the art based on the relative positional relationship of the vehicle 50 with respect to the lane 54 detected by the camera sensor 12. When a determination of "NO" is made, the CPU temporarily terminates the control. When a determination of "YES" is made, the control proceeds to step S30.

In this case, the determination as to whether or not the vehicle 50 may move out of the lane may be performed, for example, as follows. As shown in FIG. 5, the angle (yaw angle) $\theta_y$ formed by a traveling direction 62 of the vehicle with respect to a longitudinal direction 60 of the lane 54 is estimated based on image information in front of the vehicle 50. The angle $\theta_y$ is a positive value in a case where the traveling direction 62 of the vehicle 50 is on the left side with respect to the longitudinal direction 60 of the lane 54. A moving speed (a lateral speed) $V_y$ of the vehicle 50 in a direction perpendicular to the longitudinal direction 60 of the lane 54 is estimated as $V \sin \theta_y$ based on the angle $\theta_y$ and the vehicle speed V.

Further, a distance $D_y$ (not shown) is estimated, which is a distance in the lane width direction between the white line 56L (first lane boundary) on a side that the vehicle 50 approaches and the center of gravity 50A of the vehicle. Further, it may be determined that the vehicle 50 may move out of the lane when $D_y - V_y \Delta t$ is equal to or less than a preset reference value $D_{yc}$ (positive constant) with $\Delta t$ as a preset time.

In step S30, the CPU determines whether or not the driver has shown an intention to move out of the lane. When a determination of "NO" is made, the CPU advances the control to step S50. When a determination of "YES" is made, the flag $F_{off}$ is set to 1 such that the lane keeping control is not executed in step S40.

In this case, the CPU determines that the driver has shown an intention to cross the first lane boundary to move out of the lane when the driver performs at least one of shifting the turn signal lever 42 in the direction in which the vehicle will move out of the lane or steering in the direction in which the vehicle moves out of the lane. A steering operation may be determined by whether the steering torque $T_s$ detected by the torque sensor 32 is equal to or greater than a reference value $T_{sc}$ or a steering angle θ, which is a rotation angle of the steering shaft 30, is equal to or greater than a reference value $θ_{sc}$.

A steering resistance when the steering wheel is steered by the driver's steering operation becomes smaller as the vehicle speed V increases. Therefore, the reference value $T_{sc}$ may be a positive constant, but is variably set according to the vehicle speed such that it becomes smaller as the vehicle speed V increases. It is possible to appropriately determine whether or not the driver has shown an intention to cross the lane boundary to move out of the lane, as compared with a case where the reference value $T_{sc}$ is constant regardless of the vehicle speed.

In step S50, the CPU executes the lane keeping control. That is, the CPU issues a warning that the vehicle 50 may move out of the lane by activating the alarm device 18. Further, the CPU automatically steers the steered wheels 24 by the EPS device 22 such that the vehicle 50 does not move out of the lane, by outputting a command signal for automatic steering to the EPS•ECU 20.

Figure 3:
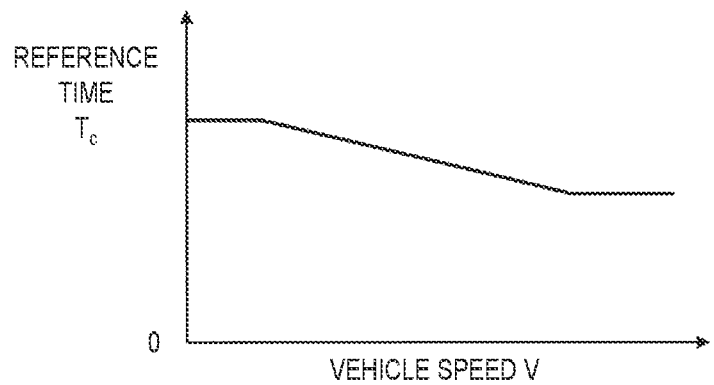
FIG. 3 is a map for calculating a reference time $T_c$ for an elapsed time based on a vehicle speed V.

In step S60, the CPU calculates a reference time $T_c$ for the elapsed time by referring to a map shown in FIG. 3 based on the vehicle speed V. As shown in FIG. 3, the reference time $T_c$ is variably set according to the vehicle speed such that it becomes shorter as the vehicle speed V increases.

In step S70, the CPU determines whether or not the condition for return to the lane keeping control is satisfied. When a determination of "YES" is made, the CPU advances the control to step S90. When a determination of "NO" is made, the CPU advances the control to step S80.

In this case, the CPU determines that the return-to-control condition is satisfied at either of time points A and B described below, depending on which is earlier. The time point A is when a determination of "YES" rather than "NO" is made in step S30; in other words, when it is determined that a time equal to or longer than the reference time $T_c$ has elapsed from a time point at which the driver has not shown but now shows an intention to move out of the lane. The time point B is when it is determined that the vehicle 50 has crossed the lane boundary and completely changed lanes; in other words, when it is determined that the whole vehicle 50 has moved out of the lane to the other lane based on the relative positional relationship between the vehicle 50 and the white line.

In step S80, the CPU determines whether or not the driver has lost their intention to move out of the lane. When the determination is "NO", the CPU temporarily terminates the control. When the determination is "YES", the control proceeds to step S90. The CPU determines that the driver has lost their intention to move out of the lane when the driver returns the turn signal lever 42 to a non-shifted position (neutral position) or when the driver performs the steering operation not to move out of the lane.

Figure 4:
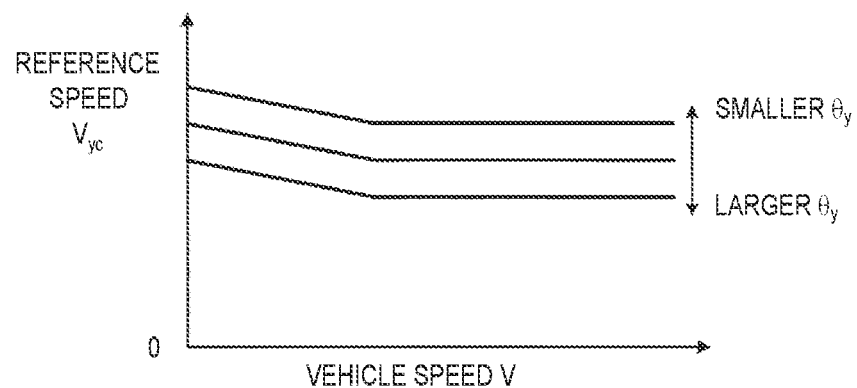
FIG. 4 is a map for calculating the reference time $T_c$ for a lateral speed $V_y$ of the vehicle based on the vehicle speed V.

In step S90, the CPU calculates a reference speed $V_{yc}$ for a lateral speed $V_y$ of the vehicle 50 by referring to a map shown in FIG. 4 based on the vehicle speed V. As shown in FIG. 4, the reference speed $V_{yc}$ is variably set according to the vehicle speed such that it becomes greater as the vehicle speed V increases. The reference speed $V_{yc}$ is variably set according to the yaw angle $θ_y$ of the vehicle 50 such that it becomes slower as the yaw angle $θ_y$ the vehicle is larger with respect to the longitudinal direction of the lane.

In step S100, the CPU determines whether or not the lateral speed $V_y$ at which the vehicle 50 approaches the white line on a side to which the vehicle may move out of the lane is equal to or faster than the reference speed $V_{yc}$. When the determination is "YES", the CPU temporarily terminates the control. When the determination is "NO", the flag $F_{off}$ is set to 0 such that the lane keeping control is returned in step S110.

Operation of Embodiment

C1. In a Case where the Vehicle 50 Will not Move Out of the Lane

In steps S10 and S20, a determination of "NO" is made. Therefore, the lane keeping control, that is, the alarm device 18 and the automatic steering of the steered wheels 24, are not activated.

C2. In a Case where the Vehicle 50 May Move Out of the Lane but the Driver does not Intend to Move Out of the Lane A determination of "NO" is made in step S10, a determination of "YES" is made in step S20, and a determination of "NO" is made in step S30. Since the lane keeping control is executed in step S50, it is possible to prevent the vehicle 50 from moving out of the lane by activating the alarm device 18 and the automatic steering of the steered wheels 24. For example, even if there is a possibility that the vehicle 50 may move out of the lane 54 as a result of the vehicle 50 unnecessarily traveling at an angle with respect to the lane 54 due to the vehicle 50 receiving a lateral force due to a crosswind or lateral slope of a road surface, or due to carelessness of the driver, it is possible to prevent the vehicle 50 from moving out of the lane 54.

C3. In a Case where the Vehicle 50 May Move Out of the Lane and the Driver has an Intention to Move Out of the Lane A determination of "NO" is made in step S10, and a determination of "YES" is made in steps S20 and S30. The flag $F_{off}$ is set to 1 in step S40. In a case where the turn signal lights 44L or 44R are blinking and/or the steering torque $T_s$ is equal to or higher than the reference value $T_{sc}$, the lane keeping control is not executed, and then a determination of "YES" is made in step S10.

C3-1. In a Case where the Condition for Return to the Lane Keeping Control is not Satisfied and the Driver has not Lost their Intention to Move Out of the Lane In steps S70 and S80, a determination of "NO" is made. Therefore, since the automatic steering of the steered wheels 24 by the lane keeping control is not activated, the driver can move out of the lane as desired, for example, change lanes.

C3-2. In a Case where the Condition for Return to the Lane Keeping Control is not Satisfied, the Driver has Lost their Intention to Move Out of the Lane, and the Lateral Speed $V_y$ is Less than the Reference Speed $V_{yc}$ A determination of "NO" is made in step S70, a determination of "YES" is made in step S80, and a determination of "NO" is made in step S100. In step S110, the flag $F_{off}$ is reset to 0 such that the lane keeping control is returned. Thus, as in the case C2, a determination of "NO" is made in step S10, a determination of "YES" is made in step S20, and a determination of "NO" is made in step S30. Since the lane keeping control is executed in step S50, it is possible to prevent the vehicle 50 from moving out of the lane by activating the alarm device 18 and the automatic steering of the steered wheels 24.

C3-3. In a Case where the Condition for Return to the Lane Keeping Control is not Satisfied, the Driver has Lost their Intention to Move Out of the Lane, and the Lateral Speed $V_y$ is Equal to or Greater than the Reference Speed $V_{yc}$ A determination of "NO" is made in step S70, but a determination of "YES" is made in step S80 and S100. Therefore, since the flag $F_{off}$ is not reset to 0 and the automatic steering of the steered wheels 24 by the lane keeping control is not activated, as in the case of C3-1, the driver can move out of the lane as desired, for example, change lanes.

C3-4. In a Case where the Condition for Return to the Lane Keeping Control is Satisfied, and the Lateral Speed $V_y$ is Less than the Reference Speed $V_{yc}$ A determination of "YES" is made in step S70, but a determination of "NO" is made in step S100. The flag $F_{off}$ is reset to 0 in step S110 such that the lane keeping control is returned. Therefore, a determination of "NO" is made in step S10, a determination of "YES" is made in step S20, and a determination of "YES" is made in step S30. Since a determination of "YES" is made in step S10, the flag $F_{off}$ is alternately set to 0 and 1, and the lane keeping control is not executed in step S50. Therefore, as in the case of C3-1, the driver can move out of the lane as desired, for example, change lanes.

C3-5. In a Case where the Condition for Return to the Lane Keeping Control is Satisfied, and the Lateral Speed $V_y$ is Equal to or Greater than the Reference Speed $V_{yc}$ In steps S70 and S100, a determination of "YES" is made. Even if the condition for return to the lane keeping control is satisfied, the flag $F_{off}$ is not reset to 0, and the automatic steering of the steered wheels 24 by the lane keeping control is not activated. Therefore, as in the case of C3-1, the driver can move out of the lane as desired, for example, change lanes.

Specific Examples of Operation

Specific examples of the operation of the embodiment will be described with reference to FIGS. 6 and 7 for the cases of C3-3 and C3-5. In the following description, each time point is a timing at which the center of gravity 50A of the vehicle 50 is at a position indicated.

Figure 6:
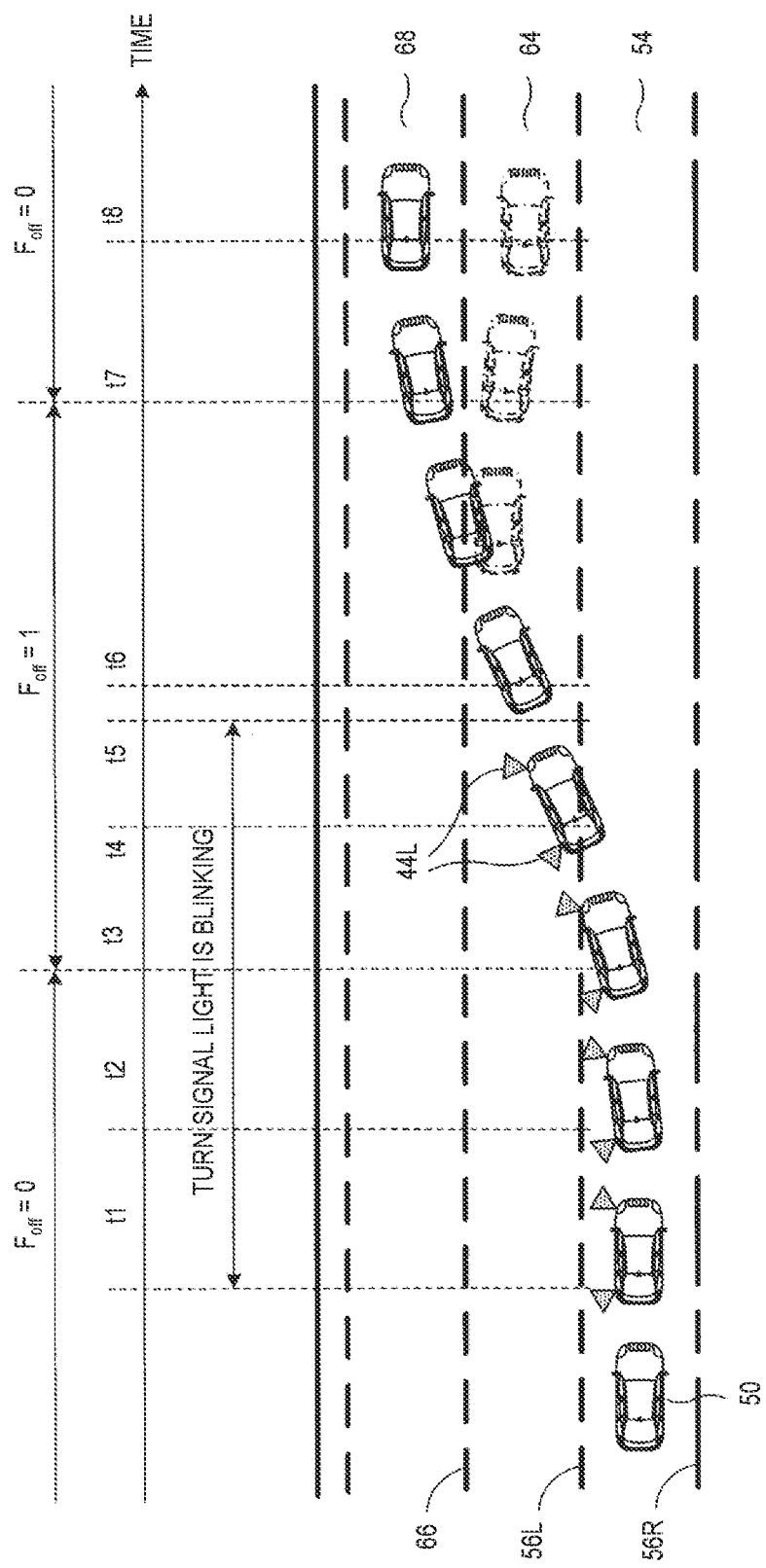
FIG. 6 is a diagram illustrating a specific example of operation of the embodiment in a case where a condition for return to lane keeping control is not satisfied, a driver has lost their intention to move out of the lane, and the lateral speed $V_y$ is less than the reference speed $V_{yc}$.

Case C3-3 (FIG. 6)

It is assumed that the turn signal lights 44L start blinking at a time point t1 when the vehicle 50 is traveling in the lane 54, and the steering torque $T_s$ becomes equal to or greater than the reference value $T_{sc}$ during a period from a time point t2 to a time point t4. Assuming that the vehicle 50 approaches the white line 56L (first lane boundary) and a determination of "YES" is made in steps S20 and S30 at a time point t3, the flag $F_{off}$ is set to 1 in step S40, such that the automatic steering of the steered wheels 24 by the lane keeping control is not activated. Therefore, the vehicle 50 can cross the white line 56L.

It is assumed that the turn signal lights 44L stop blinking at a time point t5 before a time point t6 when the condition for return to the lane keeping control is satisfied as the vehicle 50 has completely moved to an adjacent lane 64, and a determination of "YES" is made in S80. Since the lateral speed $V_y$ of the vehicle 50 is equal to or faster than the reference speed $V_{yc}$, a determination of "YES" is made in step S100 and the flag $F_{off}$ is kept at 1. Therefore, the lane keeping control continues to not be executed. Thus, the vehicle 50 can cross the white line 66 (second lane boundary) to the adjacent lane or a roadside zone 68.

Further, it is assumed that, at a time point t7, the lateral speed $V_y$ of the vehicle 50 is less than the reference speed $V_{yc}$, a determination of "NO" is made in step S100, and the flag $F_{off}$ is reset to 0. It is assumed that the vehicle 50 has completely moved to the lane or the roadside zone 68 at a time point t8.

As shown in FIG. 6, even if the driver deactivates the turn signal lights 44L to stop blinking after the vehicle 50 has crossed the white line 56L, and before the condition for return to the lane keeping control is satisfied as the vehicle 50 has completely moved to the adjacent lane 64, but the lateral speed $V_y$ of the vehicle 50 is equal to or faster than the reference speed $V_{yc}$, the vehicle can further move to the adjacent lane or the roadside zone 68.

In a case of the conventional lane departure prevention control, steps S80 to S100 are not performed, and thus the turn signal lights 44L stop blinking and a determination of "YES" is made in step S70 at the time point t5, whereby the flag $F_{off}$ is reset to 0. Since the lane keeping control is activated again, as shown by virtual lines in FIG. 6, the vehicle 50 cannot move out of the lane 64 due to the automatic steering of the steered wheels 24. Thus, the vehicle 50 cannot further continuously move to the adjacent lane or the roadside zone 68.

Case C3-5 (FIG. 7)

Until the vehicle 50 crosses the white line 66 and moves to the adjacent lane or the roadside zone 68, it is the same as in the case of C3-3. That is, the lane keeping control is not executed.

It is assumed that, at the time point t5, the condition for return to the lane keeping control is satisfied, a determination of "YES" is made in step S70, and at the later time point t6, the turn signal lights 44L stop blinking.

Since the lateral speed $V_y$ of the vehicle 50 is equal to or faster than the reference speed $V_{yc}$, a determination of "YES" is made in step S100 and the lane keeping control continues to not be executed. Thus, the vehicle 50 can cross the white line 66 (second lane boundary) to the adjacent lane or the roadside zone 68. It is the same as in the case of C3-3 after the time point t7, and the lane keeping control is executed.

Therefore, the vehicle 50 can cross the white line 56L (first lane boundary) and the white line 66 (second lane boundary) without the automatic steering of the steered wheels 24 by the lane keeping control. Thus, the vehicle 50 can further continuously move to the adjacent lane or the roadside zone 68 by crossing the lanes 54 to 58.

In a case of the conventional lane departure prevention control, at the time point t5, the condition for return to the lane keeping control is satisfied and a determination of "YES" is made in step S70, whereby the flag $F_{off}$ is reset to 0. Since the lane keeping control is activated again, as shown by virtual lines in FIG. 7, the vehicle 50 cannot move out of the lane 64 due to the automatic steering of the steered wheels 24. Thus, the vehicle 50 cannot further continuously move to the adjacent lane or the roadside zone 68.

As can be seen from the above description, according to the embodiment, even in a case where the steered wheels 24 are automatically steered as the lane keeping control, it is possible to allow the vehicle to continuously change lanes regardless of causal relationship between the time point at which the condition for return to the lane keeping control is satisfied and the time point at which the driver loses their intention to move out of the lane. Further, even in a case where the warning is issued by the alarm device 18 as the lane keeping control, the driver does not feel annoyed due to an unnecessary warning when they want to continuously change lanes.

According to the embodiment, it is determined that the return-to-control condition is satisfied when a determination is made that a time longer than the reference time $T_c$ has elapsed from the time point at which the driver has not shown but shows an intention to cross the white line 56L (first lane boundary) to move out of the lane, or when it is determined that the vehicle 50 has crossed the white line 56L. Accordingly, it is possible to prevent a situation where the automatic steering of the steering wheel or the issuing of the warning is not performed for an unnecessarily long time period by the lane keeping control, and to prevent the vehicle from moving out of the lane by executing the automatic steering of the steering wheel by the lane keeping control when the vehicle may move out of the lane.

According to the embodiment, the reference time is variably set according to the vehicle speed such that the reference time $T_c$ becomes shorter as the vehicle speed V increases. It is possible to appropriately determine whether or not the return-to-control condition is satisfied, as compared with a case where the reference time $T_c$ is constant regardless of the vehicle speed.

According to the embodiment, the reference speed is variably set according to the vehicle speed such that the reference speed $V_{yc}$ becomes faster as the vehicle speed V decreases. It is possible to appropriately determine whether or not the return-to-control condition is satisfied, as compared with a case where the reference speed $V_{yc}$ is constant regardless of the vehicle speed.

According to the embodiment, the reference speed is variably set according to the yaw angle of the vehicle such that the reference speed $V_{yc}$ becomes slower as the yaw angle $\theta_y$ the vehicle is larger with respect to the longitudinal direction of the lane. It is possible to appropriately determine whether or not the return-to-control condition is satisfied, as compared with a case where the yaw angle of the vehicle with respect to the longitudinal direction of the lane is not considered.

According to the embodiment, it is determined that the driver has shown an intention to move out of the lane boundary when the driver performs at least one of shifting the turn signal lever 42 in a direction in which the vehicle 50 will move out of the lane or steering in the direction in which the vehicle moves out of the lane. It is possible to appropriately determine whether or not the driver has shown an intention to move out of the lane as compared with a case where it is determined based on only one of shifting the turn signal lever in a direction in which the vehicle will move out of the lane or steering in the direction in which the vehicle moves out of the lane.

The present disclosure has been described in detail with respect to the specific embodiment, but the present disclosure is not limited to such an embodiment, and it will be appreciated by those skilled in the art that various other embodiments are allowed within the scope of the present disclosure.

For example, in the embodiment stated above, as the lane keeping control, the warning is issued by the alarm device 18 and the steered wheels 24 are automatically steered by the EPS device 22. However, any one of the issuing of the warning and the automatic steering of the steered wheels 24 may be omitted.

In the embodiment stated above, the reference time $T_c$ for the elapsed time is variably set, as shown in FIG. 3, according to the vehicle speed such that it becomes shorter as the vehicle speed V increases. However, the reference time $T_c$ may be constant regardless of the vehicle speed V.

In the embodiment stated above, the reference speed $V_{yc}$ for the lateral speed $V_y$ of the vehicle 50 is variably set, as shown in FIG. 4, according to the vehicle speed such that it becomes greater as the vehicle speed V decreases. However, the reference speed $V_{yc}$ may be constant regardless of the vehicle speed V.

In the embodiment stated above, the reference speed $V_{yc}$ is variably set, as shown in FIG. 4, according to the yaw angle $\theta_y$ of the vehicle 50 such that it becomes smaller as the yaw angle $\theta_y$ the vehicle is larger with respect to the longitudinal direction of the lane. However, the reference speed $V_{yc}$ may not variably set according to the yaw angle $\theta_y$ of the vehicle.

What is claimed is:

1. A lane departure prevention device comprising:
    a vehicle position of a vehicle detector configured to detect a vehicle position with respect to a lane; and
    a control unit configured to, when a determination is made that there is a possibility that the vehicle will move out of the lane based on the vehicle position detected by the vehicle position detector, execute lane keeping control, which is at least one of automatic steering of a steering wheel and issuing of a warning, wherein:
    the control unit is configured to, when a determination is made that a driver has gone from showing no intention to move out of the lane to showing an intention to move out of the lane to cross a first lane boundary, withhold the execution of the lane keeping control until a determination is made that a preset return-to-control condition is satisfied; and
    the control unit is configured to, when a determination is made that the vehicle is approaching a second lane boundary present ahead of the vehicle to which the vehicle will travel with a speed equal to or faster than a reference speed, continue withholding the execution of the lane keeping control even when the determination is made that the return-to-control condition is satisfied.

2. The lane departure prevention device according to claim 1, wherein the control unit is configured to, when the determination is made that the vehicle is approaching the second lane boundary with a speed equal to or faster than the reference speed, withhold the execution of the lane keeping control even when a determination is made that the driver has lost the intention to move out of the lane to cross the second lane boundary before the return-to-control condition is satisfied.

3. The lane departure prevention device according to claim 1, wherein the control unit is configured to determine that the return-to-control condition is satisfied at the earlier of a time when a determination is made that a time equal to or longer than a reference time has elapsed from a time point at which the driver gone from showing no intention to move out of the lane to showing an intention to move out of the lane to cross a first lane boundary, or a time when a determination is made that the vehicle has crossed the first lane boundary.

4. The lane departure prevention device according to claim 3, wherein the control unit is configured to variably set the reference time according to a vehicle speed such that the reference time becomes shorter as the vehicle speed increases.

5. The lane departure prevention device according to claim 1, wherein the control unit is configured to variably set the reference speed according to a vehicle speed such that the reference speed becomes faster as the vehicle speed decreases.

6. The lane departure prevention device according to claim 1, wherein the control unit is configured to variably set the reference speed according to a yaw angle of the vehicle such that the reference speed becomes slower as the yaw angle is larger with respect to a longitudinal direction of the lane.

7. The lane departure prevention device according to claim 1, wherein the control unit is configured to determine that the driver has shown an intention to move out of the lane when the driver performs at least one of shifting a turn signal lever in a direction in which the vehicle will move out of the lane or steering in a direction in which the vehicle moves out of the lane.

* * * * *